(12) United States Patent
Dussart et al.

(10) Patent No.: US 11,098,767 B2
(45) Date of Patent: Aug. 24, 2021

(54) CLUTCH FOR USE IN ACTUATING A WING TIP DEVICE

(71) Applicant: AIRBUS OPERATIONS LIMITED, Bristol (GB)

(72) Inventors: Gaetan Dussart, Bristol (GB); Ciaran O'Rourke, Bristol (GB); Thomas Wilson, Bristol (GB); Mudassir Lone, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/728,479

(22) Filed: Dec. 27, 2019

(65) Prior Publication Data

US 2020/0208687 A1     Jul. 2, 2020

(30) Foreign Application Priority Data

Jan. 2, 2019 (GB) ..................................... 1900047

(51) Int. Cl.
*F16D 13/32* (2006.01)
*B64C 13/28* (2006.01)
(Continued)

(52) U.S. Cl.
CPC .............. *F16D 13/32* (2013.01); *B64C 13/02* (2013.01); *B64C 13/28* (2013.01); *B64C 23/072* (2017.05);
(Continued)

(58) Field of Classification Search
CPC .............. F16D 3/24–32; F16D 43/218; B64C 3/52–52; B64C 3/38
See application file for complete search history.

(56) References Cited

U.S. PATENT DOCUMENTS

| 2,965,205 A * | 12/1960 | Winchell ................ F16D 13/66 |
| | | 192/66.23 |
| 2009/0320491 A1* | 12/2009 | Copeland .................. F02C 7/36 |
| | | 60/772 |

(Continued)

FOREIGN PATENT DOCUMENTS

| DE | 10 2013 216 429 | 2/2015 |
| GB | 2546246 | 7/2017 |

(Continued)

OTHER PUBLICATIONS

Raw translation of DE102013216429A1 by Gorges, Clutch assembly for motor vehicle, has output friction surface carrier which is non-rotatably coupled to friction surface radially, by which relative displacement of surface carrier is frictional contact to conical friction surface, Feb. 26, 2015, 14pages (Year: 2015).*

(Continued)

*Primary Examiner* — Ernesto A Suarez
*Assistant Examiner* — Lillian T Nguyen
(74) *Attorney, Agent, or Firm* — Nixon & Vanderhye P.C.

(57) ABSTRACT

A clutch for use in actuating an aircraft wing tip device is disclosed. The clutch includes first and second friction members each having a frusto-conical friction surface, and a third friction member arranged coaxially with, and between, the first and second friction members. The third friction member has first and second frusto-conical friction surfaces. When the clutch is engaged, the first and second friction surfaces of the third friction member are brought into contact with the friction surfaces of the first and second friction members, respectively. The clutch also includes spacer means operable to separate the friction surfaces from one another when the clutch is in a disengaged state.

20 Claims, 11 Drawing Sheets

(51) Int. Cl.
    *B64C 23/06*     (2006.01)
    *B64C 13/02*     (2006.01)
    *F16D 11/14*     (2006.01)
    *F16D 13/60*     (2006.01)
    *F16D 21/00*     (2006.01)

(52) U.S. Cl.
    CPC .............. *F16D 11/14* (2013.01); *F16D 13/60* (2013.01); *F16D 21/00* (2013.01)

(56) References Cited

U.S. PATENT DOCUMENTS

| | | | |
|---|---|---|---|
| 2010/0276549 A1* | 11/2010 | Karem | B64C 29/0033 244/7 A |
| 2016/0272298 A1* | 9/2016 | Thompson | B64C 3/56 |
| 2017/0016486 A1* | 1/2017 | Damm | F16D 23/06 |

FOREIGN PATENT DOCUMENTS

| | | | | |
|---|---|---|---|---|
| WO | WO-2005073584 A1 * | 8/2005 | ............ | F16D 13/26 |
| WO | 2017/118832 | 7/2017 | | |

OTHER PUBLICATIONS

Combined Search and Examination Report for GB1900047.0, dated Jun. 27, 2019, 7 pages.

\* cited by examiner

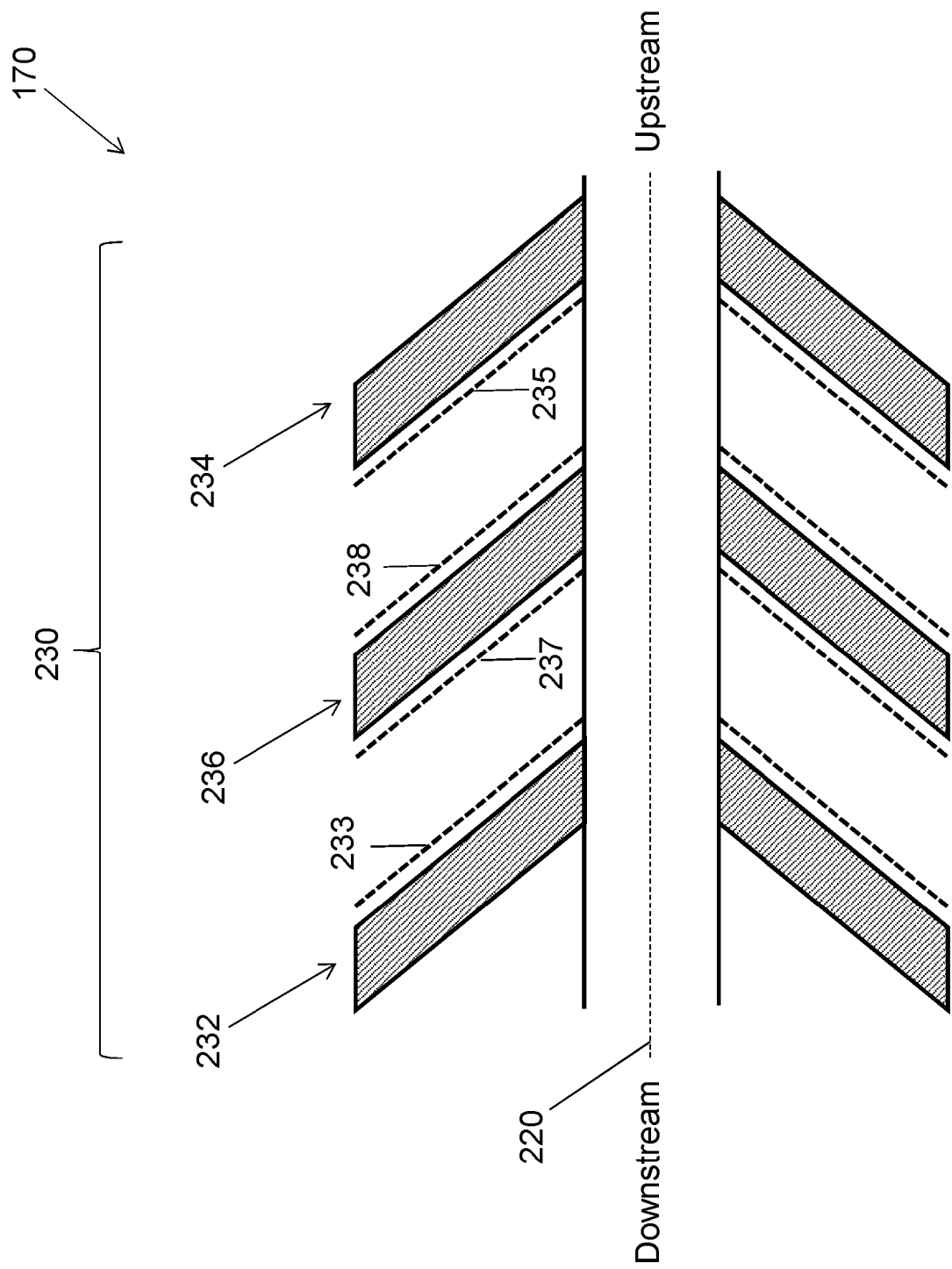

CLUTCH FOR USE IN ACTUATING A WING TIP DEVICE

CROSS RELATED APPLICATION

This application claims priority to United Kingdom (GB) Patent Application 1900047.0, filed Jan. 2, 2019, the entire contents of which is hereby incorporated by reference.

BACKGROUND OF THE INVENTION

The present disclosure relates to aircraft with moveable wing tip devices. In particular, the present disclosure relates to clutches for use in actuating such wing tip devices.

Aircraft may be equipped with moveable wing tip devices attached to fixed wings. The wing tip devices may be used to allow load-alleviation during flight, for example, in the event of wind gusts. Typically, large loads cause the wing tip device to move from a flight configuration in which the wing tip device is effectively a continuation of the fixed wing portion to a load-alleviating configuration in which the load on the wing is reduced. Once the cause of the requirement to enter the load-alleviating configuration has passed, it is often desirable to move the wing tip device back into the flight configuration. WO2017118832 discloses such a wing tip device, that is moveably mounted about a hinge.

Further, there is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage). Moveable wing tip devices may be used to enable the wing span to be reduced in a ground configuration.

An actuator, for example an electro-mechanical or hydraulic actuator, may be used to move the wing tip device between different configurations. Such an actuator may require a substantial load and/or torque capacity, particularly where the actuator is to be used during flight.

An actuator may be used in conjunction with a clutch device for selectively transmitting torque between the actuator and the wing tip device. The clutch device may be capable of selectively disengaging the wing tip device from the actuator (for example to protect the actuator componentry from torques and/or bending moments caused by forces acting upon the wing tip device during flight). As such, the clutch device may be required to function under, and withstand, significant torques. Further, on-board space is an important consideration on aircraft. Some aircraft may not have enough space for a sufficiently powerful clutch device capable of withstanding torques as desired. It is thus desirable to provide a clutch device that is able to withstand and transmit the required amounts of torque, whilst fitting within relatively narrow spatial constraints.

The present invention seeks to mitigate one or more of the above-mentioned problems. Alternatively or additionally, the present invention seeks to provide an improved clutch, aircraft and aircraft wing.

SUMMARY OF THE INVENTION

According to a first aspect, there is provided a clutch for use in actuating a wing tip device on an aircraft, the aircraft comprising a fixed wing, a wing tip device, and a wing tip actuator for moving the wing tip device relative to the fixed wing. The clutch is operable to selectively transmit torque between the wing tip actuator and the wing tip device via engagement of a first shaft with a second shaft. The clutch comprises first and second friction members coupled with the first shaft. The first and second friction members each have a frusto-conical friction surface. The clutch also comprises a third friction member coupled with the second shaft. The third friction member is arranged coaxially with, and between, the first and second friction members. The third friction member has first and second frusto-conical friction surfaces operable such that, when the clutch is engaged, the first and second friction surfaces of the third friction member are brought into contact with the friction surfaces of the first and second friction members, respectively. The clutch also comprises spacer means arranged between the first and second friction members. The spacer means are operable to separate the first and second friction surfaces of the third friction member from the friction surfaces of the first and second friction members, respectively, when the clutch is in a disengaged state.

As such, the clutch comprises a coaxial stack of frusto-conical friction surfaces which are brought together when the clutch is engaged, and which are kept separate from one another via the spacer means when the clutch is in the disengaged state. Such a configuration has been found to provide a high torque density clutch device which tends to be scalable, long-lasting and able to comply with relatively narrow spatial restrictions, as will be described in more detail below.

Using a friction-surface based clutch instead of some other types of clutch, e.g. a dog clutch, is beneficial for withstanding the substantial loads associated with wing tip device actuation. Such high loads when applied to a dog clutch, for example, may cause the teeth/splines of the dog clutch to structurally fail, thus limiting the lifespan of such a device. Friction surfaces are less likely to structurally fail due to high loads than teeth/spline based devices.

By using frusto-conical friction surfaces (that is, surfaces having a curvature corresponding to the frustum of a cone) instead of differently shaped friction surfaces (e.g. disc-shaped surfaces), a greater torque transmission capability can be achieved within a given overall device diameter. For example, for a given device diameter, a frusto-conical friction surface can provide a greater surface area for frictional contact than a disc-shaped friction surface can. Since the torque transmission capability of the device is proportional to the surface area for frictional contact, frusto-conical friction surfaces are thus beneficial over disc-shaped friction surfaces. Further, using frusto-conical friction surfaces instead of disc-shaped friction surfaces causes a reduction in the axial force required to maintain non-slip pressure between the friction surfaces.

The clutch comprises three friction members (although in some cases the clutch can comprise more than three friction members, as described below), comprising two pairs of friction surfaces between them. That is, the first pair includes the friction surface of the first friction member and the first friction surface of the third friction member, and the second pair includes the friction surface of the second friction member and the second friction surface of the third friction member. In general, for N friction members, there may be N−1 friction surface pairs. Each pair of friction surfaces is brought together when the clutch is engaged, and is separated when the clutch is disengaged. The torque transmission capability of the clutch device is thus increased compared to a case in which only a single pair of friction surfaces are brought into contact.

Further, using a set of frusto-conical friction surfaces allows the friction members to be stacked in a geometrically compact, and dense, structure. In particularly, the stack of friction surfaces may allow the clutch device to have a desirably limited diameter. By stacking multiple frusto-conical friction surfaces in such a manner, a high torque density is achieved (due to the multiple pairs of friction surfaces, stacked together and each having a relatively large frictional contact area) within a constrained geometry, e.g. a tubular structure. Such an arrangement has been found to be particularly beneficial for use in selectively transmitting torque between a wing tip device and a wing tip actuator on an aircraft, in which spatial constraints and the ability to withstand and/or transmit high torque and loads are important considerations.

The spacer means acts to separate the friction surfaces from one another when the clutch is in the disengaged state. The spacer means may be operable to prevent the friction surfaces from contacting one another when the clutch is in the disengaged state. The spacer means may be operable to limit the extent to which friction members are able to be displaced along the coaxial direction when the clutch is in the disengaged state. In some cases, the spacer means is operable to keep a distance between friction surfaces of a given friction surface pair above a predetermined value, when the clutch is in the disengaged state. By separating the friction surfaces from one another in the disengaged state, an amount of wear on a given friction surface due to contacting another friction surface may be reduced, thereby increasing the effective lifetime of the clutch device.

When the clutch is in the disengaged state, the first shaft may be free to rotate relative to the second shaft in a substantially frictionless manner. Since the spacer means prevents opposing friction surfaces from contacting one another, the clutch may be considered to be substantially frictionless when in the disengaged state, in the sense that the first shaft can rotate relative to the second shaft with negligible, or even zero, friction.

The spacer means may be configured such that, when the clutch is in the disengaged state, a distance between the first friction surface of the third friction member and the friction surface of the first friction member is substantially equal to a distance between the second friction surface of the third friction member and the friction surface of the second friction member. In some cases, the distance between the first friction surface of the third friction member and the friction surface of the first friction member is different from the distance between the second friction surface of the third friction member and the friction surface of the second friction member, but such a difference may be kept below a predetermined threshold by the spacer means.

By controlling the distances between mutually-facing friction surfaces in the disengaged state (e.g. by causing the distances between friction surfaces in different friction surface pairs to be similar to one another), the different friction surface pairs may achieve relatively uniform and/or simultaneous frictional contact when the clutch is engaged. In other words, when the clutch is engaged, the load may be distributed more evenly amongst the friction surface pairs compared to a case in which the distances between the friction surfaces are not controlled in the disengaged state. This may further reduce wear and/or pressure on a given friction surface (since the load is distributed relatively evenly amongst all of the friction surface pairs, rather than being biased towards a subset of the friction surface pairs), thereby enabling the reliability and lifetime of the clutch device to be increased.

The spacer means may be configured to resiliently bias the first and second friction members towards the disengaged state. For example, the spacer means may be operable to generate a biasing force to urge the friction members towards the disengaged state. The biasing force generated by the spacer means may be capable of assisting with the disengaging of the clutch, e.g. through use of an actuator or restoring spring. In other words, the clutch may be disengaged through a combination of a restoring spring/actuator and the spacer means. In some cases, the spacer means may be capable of disengaging the clutch without the use of a separate restoring spring/actuator.

The spacer means may comprise an elastic spacer. The spacer means may comprise at least one spring. The spacer means may comprise a polymer or other elastic material in other cases. An elastic spacer may be particularly beneficial in separating the friction surfaces from one another, and ensuring an even spacing between the friction surfaces, when the clutch is in the disengaged state. The elastic spacer may be compressed (by a compressing force) when the clutch is engaged, to allow the friction surfaces to be brought into contact with one another. Disengaging the clutch may cause the force compressing the elastic spacer to be released, thereby allowing the elastic spacer to expand and quickly separate the friction surfaces from one another in a uniform and repeatable manner.

The first, second and third friction members may be moveable in a coaxial direction independently of one another. As such, not only can the friction members be brought into frictional contact with one another when the clutch is engaged (by moving the friction members relative to one another in the coaxial direction), but the friction members can effectively "self-space" when the clutch is disengaged. That is, the positions of the friction members along the coaxial direction may be adjustable in conjunction with the spacing means. Therefore, a more uniform spacing (when the clutch is disengaged) and a more uniform contact (when the clutch is engaged) may be achieved, thereby further reducing wear on the friction surfaces and/or undesired friction when the clutch is in the disengaged state.

The first shaft may comprise a central shaft. The second shaft may comprise an outer housing at least partially encompassing the central shaft. The central shaft and the outer housing may be configured to rotate together about a shared rotational axis when the clutch is in an engaged state. Providing an outer housing (which may be tubular, for example) encompassing and rotatable with a central shaft results in a more compact, space-saving structure than some other clutch arrangements. Further, providing a tubular structure within which the friction members are housed enables maintenance to be simplified, as the structure can be "unplugged" as a single unit, and replaced as a single unit.

The first and second friction members may be coupled to the first shaft, and the third friction member coupled to the second shaft, via splines. For example, the splines may be in the outer housing, the central shaft, and/or the friction members. The splines may be orientated substantially parallel to the shared rotational axis. Orientating the splines substantially parallel to the shared rotational axis may enable the friction members to be coupled more securely and/or rigidly to their respective shafts, thereby improving the structural integrity of the clutch device, and/or its ability to withstand significant torques, compared to a case in which different spline geometries are used. Further, orientating the splines substantially parallel to the shared rotational axis may allow the friction members to move in the coaxial direction independently of the shafts and/or independently of one another. This may facilitate self-spacing of the friction members (in conjunction with the spacer means) when the clutch is in the disengaged state.

The friction surface of the first and/or second friction member, and/or one or both of the friction surfaces of the third friction member, may be comprised of aluminium. The friction surface of the first and/or second friction member, and/or one or both of the friction surfaces of the third friction member, may be comprised of an aluminium alloy. Friction surfaces comprised of aluminium or aluminium alloy may provide a higher torque capability than friction surfaces made from some other materials. The higher the torque capability (e.g. based on material friction coefficient) of a given friction surface, the fewer friction surfaces are required in order to achieve a desired overall torque capability for the clutch device. By using fewer friction members, the clutch device can be made smaller and space can be saved. Friction surfaces may be comprised of other materials in some cases. For example, one or more of the friction surfaces may be comprised of rubber or steel.

The clutch may comprise a fourth friction member coupled with the second shaft and arranged coaxially with the first, second and third friction members. The second friction member is arranged between the third friction member and the fourth friction member. The fourth friction member has a frusto-conical friction surface. The second friction member may have first and second frusto-conical friction surfaces operable such that, when the clutch is engaged, the first friction surface of the second friction member is brought into contact with the second friction surface of the third friction member, and the second friction surface of the second friction member is brought into contact with the friction surface of the fourth friction surface. As such, three friction surface pairs may be used in some cases (instead of two). A clutch device with three friction surface pairs may have a greater torque capability than a comparative clutch device with two friction surface pairs. Since the friction members are stackable and coaxial, providing an additional friction member may require relatively little additional space compared to the three-friction member case. In particular, providing an additional friction member may require no increase in the diameter of the clutch device. Therefore, the torque capability of the clutch device can be increased without a significant increase in the size of the clutch device. Further friction members may be provided in some examples.

The clutch may be used for selectively disengaging the wing tip device from the wing tip actuator, e.g. from one or more motors and/or gearboxes. As such, the wing tip actuator may be protected from torque acting upon or caused by the wing tip device. For example, when the wing tip device is allowed to passively (i.e. under aerodynamic forces) move from a flight configuration to a load alleviating configuration, the moving wing tip device may impart a torque on the wing tip actuator. Selectively disengaging the wing tip device from the wing tip actuator may prevent the wing tip actuator from being back-driven, and may thus reduce the likelihood of damage or wear to the wing tip actuator. The clutch may be arranged to selectively decouple the wing tip actuator from the wing tip device. As such, the wing tip actuator may be reversibly and repeatably couplable with the wing tip device.

According to a second aspect, there is provided a clutch assembly comprising the clutch of the first aspect, and further comprising a dog clutch. As such, a dog clutch may contribute to the torque capabilities of the clutch assembly. By using a dog clutch to assume a portion of the torque requirement, the number of friction members in the friction clutch and/or the size of each friction member may be reduced, thereby reducing the overall size of the friction clutch. Further, the addition of a dog clutch to assume some of the torque burden may reduce a likelihood of the friction clutch slipping. In turn, the dog clutch is exposed to less torque than would be the case if the dog clutch alone (without the friction clutch) were used. Therefore, a likelihood of damage or structural failure of the dog clutch teeth/splines may be reduced.

The dog clutch may be arranged coaxially with the friction clutch. By arranging the friction clutch and the dog clutch coaxially, a single actuator (e.g. applying a mechanical force in the coaxial direction) may be used to actuate both clutches, thereby simplifying the clutch assembly and its use. Further, arranging the dog clutch coaxially with the friction clutch may result in a more compact, space-saving and/or aerodynamic structure compared to a case in which the clutches are not arranged coaxially.

The dog clutch may be at least partially enclosed by the first shaft and/or the second shaft. For example, the dog clutch may be housed within the central shaft. As such, a more compact and/or space-saving arrangement may be provided compared to a case in which the dog clutch is not enclosed by first shaft and/or the second shaft.

The clutch assembly may be configured to be engaged by, sequentially, engaging the friction clutch and then engaging the dog clutch. By engaging the friction clutch before engaging the dog clutch, the friction clutch is able to reduce the load on the clutch assembly before the dog clutch is engaged, thereby protecting the dog clutch from the higher load. Once the load has been reduced by the friction clutch, the dog clutch may be engaged in order to effectively "lock" the clutch assembly and prevent the friction clutch from slipping. Thus a clutch assembly that is both reliable and long-lasting, as well as secure when engaged, may be provided. In some cases, the dog clutch is engaged before the friction clutch.

The friction clutch may be configured to be engaged when an applied axial force exceeds a first threshold value. The dog clutch may be configured to be engaged when an applied axial force exceeds a second threshold value, different from the first threshold value. The first threshold value may be less than the second threshold value. As such, when a progressively increasing axial force is applied (e.g. to a common actuator of the clutch assembly), the friction clutch is first engaged (when the force exceeds the first threshold value), and the dog clutch is subsequently engaged (when the force exceeds the second threshold value).

The friction clutch may comprise a first restoring spring operable to generate a first restoring force to urge the clutch into the disengaged state. The dog clutch may comprise a second restoring spring operable to generate a second restoring force to urge the dog clutch into a disengaged state. The first restoring spring has a spring constant having a first value, and the second restoring spring has a spring constant having a second value. The first value may be different from the second value. The value of the spring constant of the first restoring spring may be smaller than the value of the spring constant of the second restoring spring. As such, an applied axial force (to actuate the clutch assembly) may first overcome the restoring force of the restoring spring associated with the friction clutch, to engage the friction clutch, and may then overcome the restoring force of the restoring spring associated with the dog clutch, to engage the dog clutch. Further, when the clutch assembly is to be disengaged, the different spring constants of the restoring springs enable the different clutch elements to be released sequentially. For example, the dog clutch may be released first, due to its restoring spring having a relatively high spring constant, and the friction clutch may be released second, due to its restoring spring having a relatively low spring constant. This allows the friction clutch to continue to impede the relative rotation of the shafts (at least partially) until the dog clutch teeth have fully disengaged. This may reduce stresses occurring at the ends of the dog clutch teeth, making the teeth less susceptible to cracking or other structural damage. Alternatively, dog and friction clutch mating may be done using two actuation means working in parallel rather than a single actuation means with two different springs.

According to a third aspect, there is provided an aircraft wing comprising the clutch of the first aspect and/or the clutch assembly of the second aspect.

According to a fourth aspect, there is provided an aircraft comprising the aircraft wing of the third aspect.

The common rotational axis of the first, second and third friction members may be orientated substantially parallel to a line-of-flight direction of the aircraft. By orientating the clutch substantially parallel with the line-of-flight direction, an amount of aerodynamic drag caused by the clutch may be reduced, compared to a case in which the clutch is not orientated substantially parallel with the line-of-flight direction (for example, where the clutch is orientated along or parallel with a wing tip hinge that is non-parallel to the line-of-flight direction). This results in an improved aerodynamic profile compared to a case in which the clutch is not aligned with the line-of-flight.

The aircraft may comprise a fixed wing and a wing tip device, the wing tip device being rotatably mounted on a hinge at the tip of the wing such that the wing tip device may rotate, about the hinge, relative to the fixed wing. The hinge axis may be orientated non-parallel to the line-of-flight direction of the aircraft. As such, the clutch may be orientated non-parallel with the hinge of the wing tip device. In some cases, however, the common rotational axis of the first, second and third friction members is orientated substantially parallel to the hinge of the wing tip device. More preferably, the first, second and third friction members may be coaxial with the hinge of the wing tip device.

As stated above, the hinge may be orientated non-parallel to the line-of-flight direction. The hinge may be orientated such that the hinge at the trailing edge of the wing is further inboard than the hinge at the leading edge of the wing. The hinge may be orientated such that in a load alleviating configuration, the mean incidence of the wing tip device is reduced. The hinge may be orientated substantially perpendicular to the swept mean chord axis of the wing. The swept mean chord axis may be parallel to the longitudinal direction of the wing box. Such an arrangement has been found to be beneficial in terms of enabling a load reduction (in comparison with a hinge that is orientated parallel to the line-of-flight). Furthermore, such an orientation of hinge has been found to facilitate movement of the wing tip device to a stable load alleviating configuration. For example, when the hinge is in such an orientation, the wing tip device tends to move to a static-aeroelastically stable position even under purely aerodynamic loading. This orientation of hinge is therefore especially beneficial in combination with a restraining assembly in embodiments of the invention (as described below). The hinge may be orientated substantially perpendicular to the leading edge of the wing in some cases. The orientation of the hinge may be chosen such that it acts to stabilise flutter.

The wing tip device may be a wing tip extension; for example the wing tip device may be a planar tip extension. In other embodiments, the wing tip device may comprise, or consist of, a non-planar device, such as a winglet.

According to a fifth aspect, there is provided a method for selectively transmitting torque on an aircraft. The method comprises providing a clutch comprising a plurality of frusto-conical friction members including first, second and third friction members having a common rotational axis. The third friction member comprises a first friction surface and a second friction surface, opposite the first friction surface. The method further comprises engaging the clutch by moving two or more of the first, second and third friction members along the common rotational axis, such that the first and second friction surfaces of the third friction member are brought into contact with friction surfaces of the first and second friction members, respectively. The clutch comprises spacer means arranged between the first friction member and the second friction member. The spacer means are operable to separate the first and second friction surfaces of the third friction member from the friction surfaces of the first and second friction members, respectively, when the clutch is in a disengaged state.

According to a sixth aspect, there is provided an aircraft. The aircraft comprises a wing. The wing has a fixed wing with a wing tip device. The wing tip device is rotatably mounted on a hinge, such that the wing tip device may rotate, about the hinge, relative to the fixed wing. The aircraft comprises an actuator operable to cause the wing tip device to rotate about the hinge. The aircraft also comprises a clutch arranged to selectively disengage the wing tip device from the actuator. The clutch comprises a plurality of frusto-conical friction members including first, second and third friction members having a common rotational axis. Each of the first, second and third friction members are moveable independently along the common rotational axis. The third friction member comprises a first friction surface and a second friction surface, opposite the first friction surface. The plurality of friction members is arranged such that, when the clutch is engaged, the first and second friction surfaces of the third friction member are brought into contact with the friction surfaces of the first and second friction members respectively, to enable torque to be transmitted between the wing tip device and the actuator.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 2C shows a close-up view of part of the clutch of the first embodiment;

DETAILED DESCRIPTION

Figures 1A, 1B:
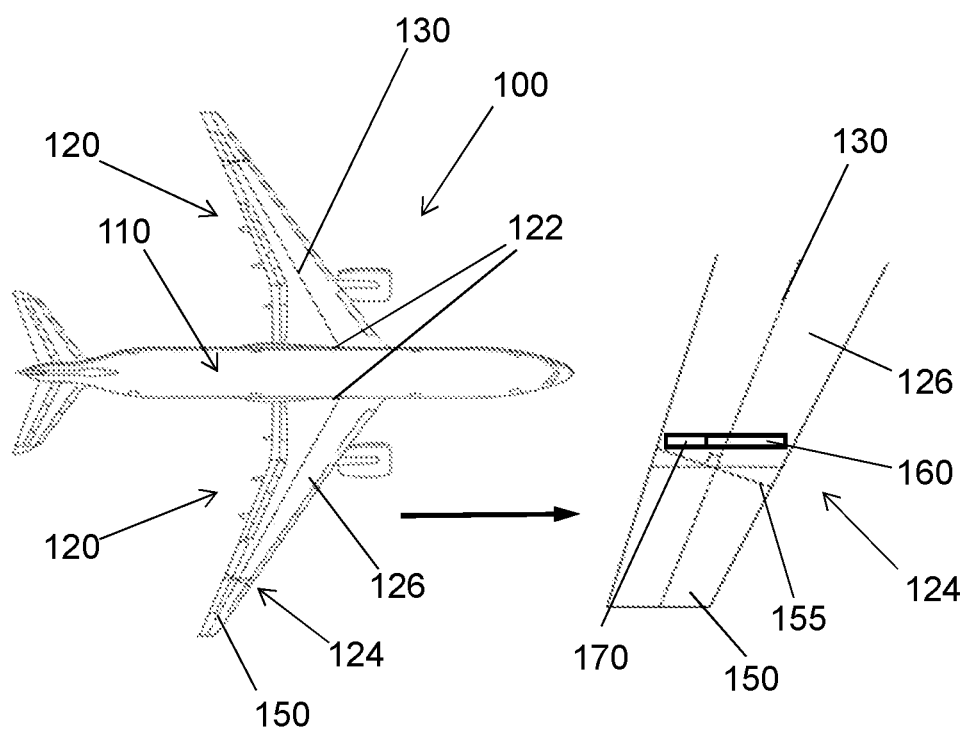
FIG. 1A shows a schematic plan view of an aircraft according to a first embodiment.
FIG. 1B shows a schematic plan view of part of a wing of the aircraft of FIG. 1A.

FIG. 1A is a plan view of an aircraft 100 according to a first embodiment. The aircraft 100 comprises a central fuselage 110 and two main wings 120 extending outwardly from respective wing roots 122.

Each wing 120 comprises a fixed wing 126 extending from the root 122 to the tip 124 (shown in close up in FIG. 1B). At the tip 124 of the fixed wing 126, the wing 120 also comprises a moveable wing tip device 150. In this embodiment, the wing tip device 150 comprises a planar wing tip extension. The wing tip device 150 is rotatably mounted on a hinge 155 (depicted with a dashed line in FIGS. 1A and 1B). As such, the wing tip device 150 is able to rotate about the hinge 155 relative to the fixed wing 126.

In this embodiment, the hinge 155 is orientated non-parallel to a line-of-flight direction of the aircraft 100 (the line-of-flight direction being shown with a dashed line in FIG. 1B for comparison). More specifically, in this embodiment, the hinge 155 is orientated perpendicular to the swept mid-chord axis 130. The hinge 155 may have other orientations in other embodiments.

The aircraft 100 also comprises a wing tip actuator 160 and a clutch 170, as will be described in more detail below. The wing tip actuator 160 is operable to rotate the wing tip device 150 about the hinge 155. The wing tip actuator 160 may comprise a tubular shaft housing one or more motors and/or gearboxes configured to rotate the shaft about its rotational axis. The tubular shaft may be orientated substantially parallel to the line-of-flight direction. The tubular shaft may be coupled to a secondary shaft (not shown) via a bevel gear or alternative means to change the direction of axis of rotation. The secondary shaft may be aligned with the hinge 155 and/or may form part of the hinge 155. Rotation of the tubular shaft may cause rotation of the secondary shaft (via the bevel gear for instance), which in turn causes the wing tip device 150 to rotate about the hinge 155.

The clutch 170 is operable to selectively transmit torque between the wing tip device 150 and the wing tip actuator 160. In this embodiment, the clutch 170 is orientated substantially parallel to the line-of-flight direction. As such, the clutch 170 is orientated non-parallel to the hinge 155. The clutch 170 is orientated substantially parallel with the tubular shaft of the wing tip actuator 160. More preferably, the clutch 170 may be coaxial with the tubular shaft of the wing tip actuator 160. In some examples, the clutch 170 is comprised in the wing tip actuator 160. The clutch 170 may be configured to selectively disengage the wing tip device 150 from all or part of the wing tip actuator 160. The clutch 170 may be arranged between the tubular shaft of the wing tip actuator 160 and the bevel gear connecting the tubular shaft to the secondary shaft and/or hinge 155. The clutch 170 may reduce a likelihood of back-driving of the wing tip actuator 160, thereby reducing a likelihood of damage to the componentry of the wing tip actuator 160, e.g. motors and/or gearboxes. If engagement of the wing tip device 150 with the wing tip actuator 160 is maintained when the wing tip device 150 is released from the flight configuration to the load alleviating configuration (e.g. when a restraining assembly is released (as described below), causing a relatively quick movement of the wing tip device out of the flight configuration), a substantial amount of torque may be transmitted from the wing tip device 150 to the wing tip actuator 160. Therefore, in order to protect the componentry of the wing tip actuator 160 from mechanical stress and/or back-driving, the clutch 170 enables those components to be quickly disengaged from the wing tip device 150 (e.g. prior to or during the wing tip device 150 being released into the load alleviating configuration).

Figure 1C:
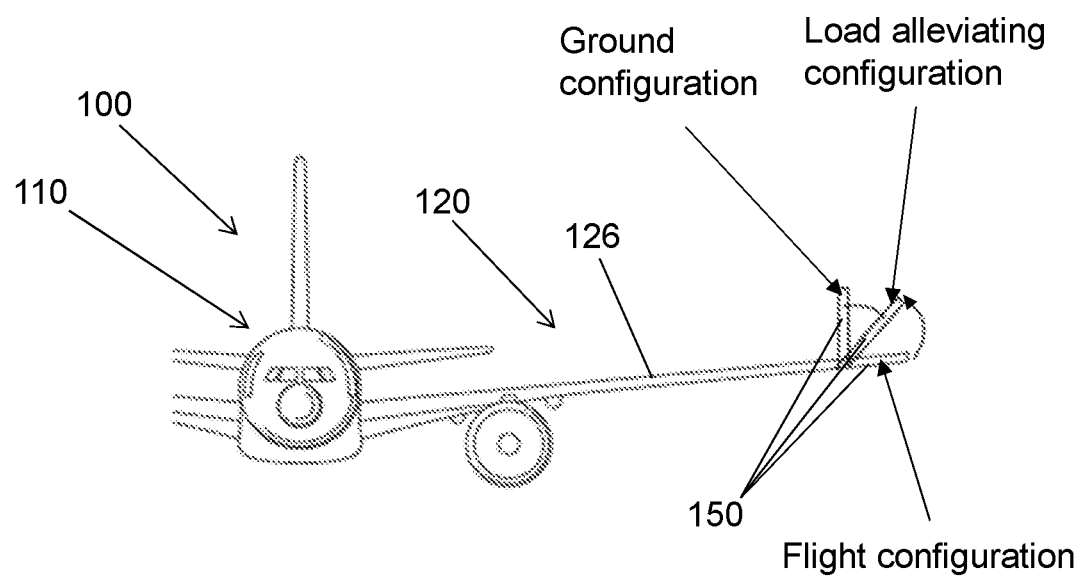
FIG. 1C shows a schematic front view of the aircraft of FIGS. 1A and 1B.

Referring to FIG. 1C, the wing tip device 150 is rotatable about the hinge 155 between a flight configuration, a load-alleviating configuration, and a ground configuration.

In the flight configuration, the wing tip device 150 is an extension of the fixed wing 126. Accordingly, the upper and lower surfaces of the fixed wing 126 are continuous with the upper and lower surfaces of the wing tip device 150 in this embodiment. The leading and trailing edges of the fixed wing 126 are also continuous with the respective leading and trailing edges of the wing tip device 150 (see FIGS. 1A and 1B). Such an arrangement is beneficial as it provides a relatively large wing span, thereby providing an aerodynamically efficient aircraft. However, a large span can result in correspondingly large loads on the wing 120, particularly a large wing root bending moment, especially during high load events such as gusts or extreme manoeuvres. The wing 120 may be sized to cope with these maximum loads, which can result in a relatively heavy wing. The ability of the wing tip device 150 to move to the load-alleviating configuration seeks to address that problem.

The wing tip device 150 is rotatable, upwards, from the flight configuration to the load alleviating configuration. The wing tip device 150 may be rotatable such that the lower surfaces between the fixed wing 126 and the wing tip device 150 are no longer continuous with one another. Since the hinge 155 is angled with respect to the airstream-wise direction, when the wing tip device 150 rotates upwards its mean incidence is reduced. In this configuration the lift generated by the wing 120 is significantly reduced and the load on the wing tip device 150 is also significantly reduced. The wing tip device 150 is moveable to this configuration during flight. In the load alleviating configuration, the load on the wing tip may be reduced. Such an arrangement has been found to be especially beneficial when the aircraft is undergoing roll. Load alleviation has also been found to be especially beneficial during low-speed operations (e.g. during take-off, climb and/or landing). By moving the wing tip device to the load alleviating configuration, the onset of stall may be alleviated. This may assist the aircraft in meeting low speed requirements, especially for take-off and climb.

The wing tip device 150 is also configurable in a ground configuration in which the wing tip device 150 is rotated yet further, to a substantially upright position (shown in FIG. 1C). The wing tip device 150 is moveable to this configuration when the aircraft 100 is on the ground. Once rotated to such a position, the span of the aircraft 100 is sufficient to meet airport compatibility gate limits. Thus, the aircraft 100 of the first embodiment can have a large span (exceeding gate limits) during flight, but is still able to comply with gate limits when on the ground.

In this embodiment, the aircraft 100 is provided with a restraining assembly (not shown). The restraining assembly is described in detail in WO2017118832. The restraining assembly comprises a shaft (that forms the shaft of the hinge 155), a brake and a rotational spring. The brake comprises pads configured to selectively clamp against the shaft to restrain its motion. The restraining assembly is operable between a restraining mode (in which the brake is deployed to brake the rotation of the shaft), and a releasing mode (in which the brake is released by pulling the pads away from the shaft to allow its free rotation (and thus rotation of the wing tip device)). The default (passive) mode of the restraining assembly is the restraining mode in which the shaft is braked. When the wing tip device is in the flight configuration, the power to the restraining assembly is switched OFF (i.e. the restraining assembly is passive) and the restraining assembly is left with the shaft braked. A control module (not shown) may switch the restraining assembly ON, e.g. when an oncoming gust is detected, which releases the brake. Such an arrangement enables the wing tip device to be securely held in the flight configuration during normal cruise flight, but by switching the releasing assembly ON to release the brake, the wing tip device is movable quickly to the load alleviating configuration. This means the wing can avoid being subjected to high gust loadings. This in turn may enable the wing to have a relatively large span, without necessarily having to incur the associated weight penalty, because it can be designed for a lower magnitude of maximum load.

The wing tip device may, at least partially, be moveable to the load alleviating configuration purely under the action of aerodynamic force acting on it during flight, or under the gust loads. However, in this embodiment, the restraining assembly comprises a rotational spring (not shown). The rotational spring is located at one end of the hinge. The rotational spring is preloaded such that when the wing tip device is in the flight configuration, it exerts a biasing force that urges the wing tip device towards the load alleviating configuration. That biasing force is unable to overcome the restraining force exerted by the brake when it is deployed. However, when the brake is released, the biasing force (in addition to aerodynamic forces acting on the wing tip device) acts to rotate the wing tip device about the hinge. The pre-loaded spring is an example of a biasing member. Providing a pre-loaded spring in this manner has been found to be beneficial as it quickly moves the wing tip device to the load alleviated configuration, as soon as the brake has been released.

The wing tip actuator 160 is operable to move the wing tip device 150 from the load alleviating configuration to the flight configuration. In some cases, the wing tip actuator 160 is operable to move the wing tip device 150 from the flight configuration to the load alleviating configuration. Further, the wing tip actuator 160 may be operable to move the wing tip device 150 from the ground configuration to the flight configuration and/or vice-versa.

It will be appreciated that wing tip devices may be moveable in a different manner (e.g. without the use of a restraining assembly and/or biasing member) in other embodiments.

In some examples, the clutch 170 is comprised in the restraining assembly. For example, the clutch 170 may be engaged when the wing tip device 150 is in the flight configuration, and may be disengaged to cause the wing tip device 150 to move to the load alleviating configuration (e.g. releasing the restraining force may cause the clutch 170 to be disengaged).

Figure 2A:
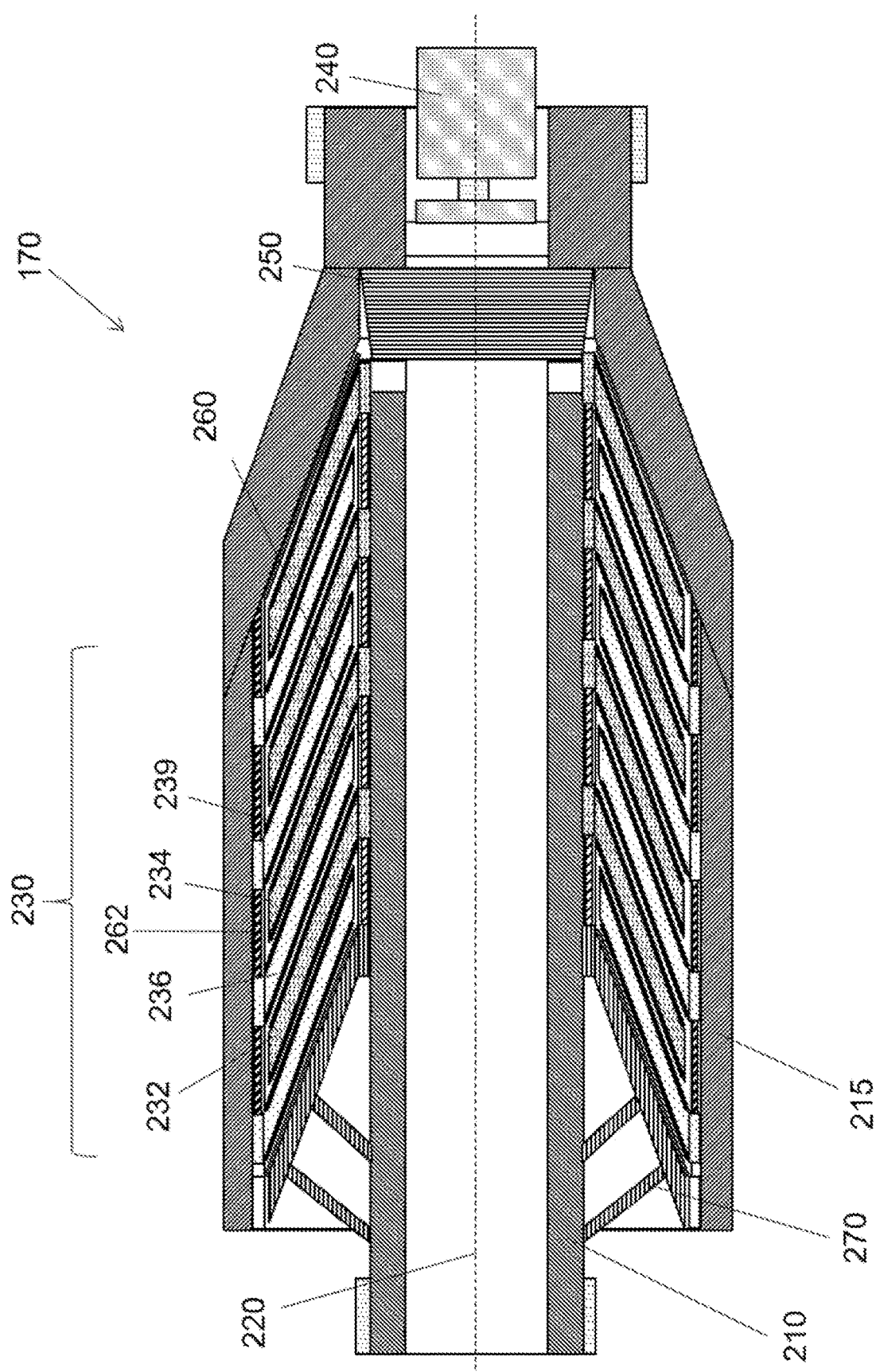
FIG. 2A shows a schematic longitudinal section view of a clutch according to the first embodiment, in a disengaged state.
Figure 2B:
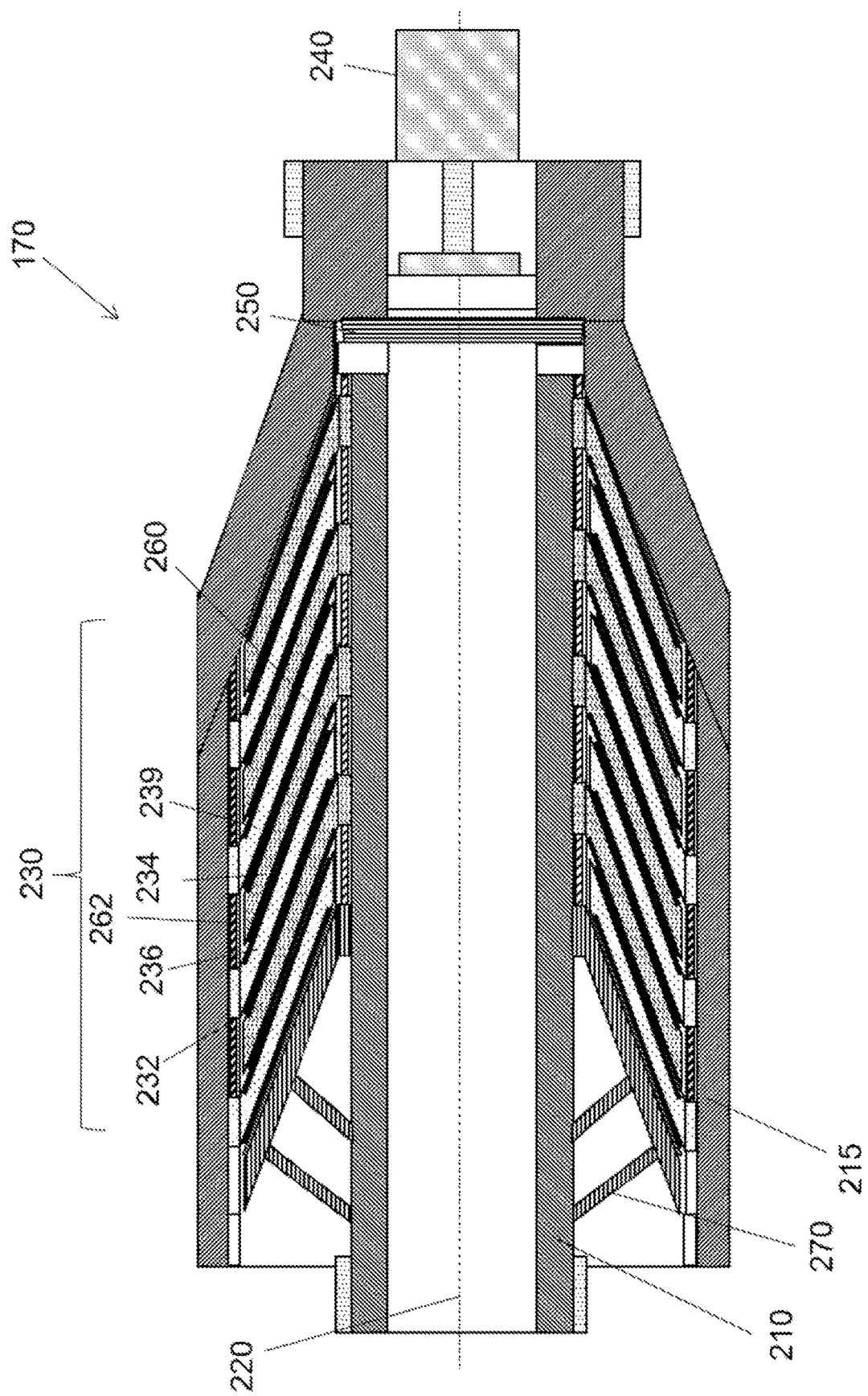
FIG. 2B shows a schematic longitudinal section view of the clutch of the first embodiment, in an engaged state.
Figure 2D:
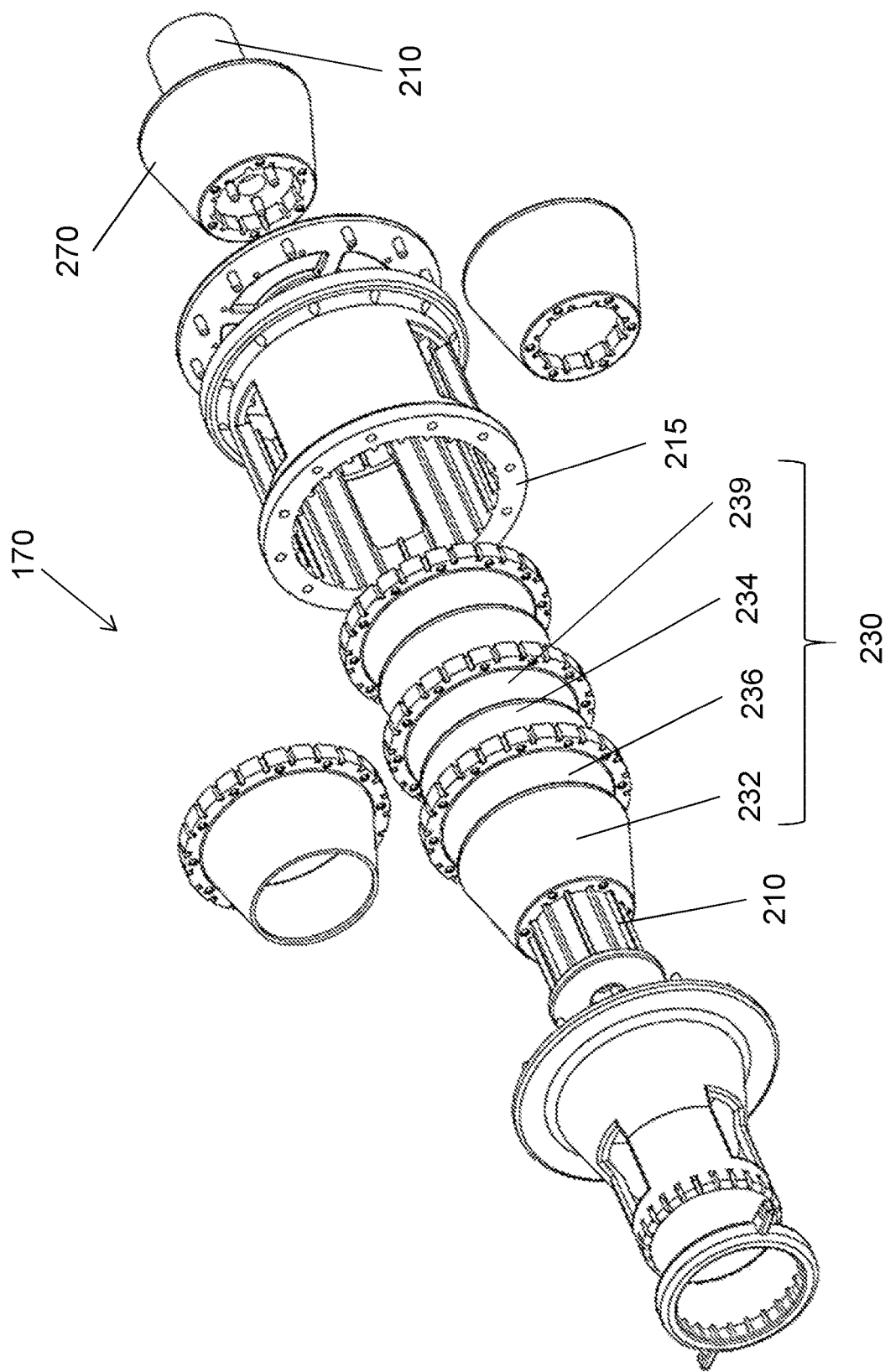
FIG. 2D shows an exploded view of the clutch of the first embodiment.

FIGS. 2A to 2D are views of the clutch 170 according to the first embodiment. FIG. 2A is a longitudinal section view showing the clutch 170 in a disengaged state. FIG. 2B is a longitudinal section view showing the clutch 170 in an engaged state. FIG. 2C is a close-up view of a part of the clutch 170 in the disengaged state. FIG. 2D is an exploded view of some of the components of the clutch 170.

The clutch 170 comprises a central shaft 210 and an outer housing 215. The central shaft 210 and the outer housing 215 are examples of first and second shafts, which are engaged such that they rotate together about a common rotation axis 220 (depicted with a dashed line in FIGS. 2A to 2C) when the clutch 170 is in the engaged state.

The clutch 170 comprises a plurality of friction members 230. Each friction member in the plurality of friction members 230 is substantially conically shaped in this embodiment. More particularly, each friction member has a frusto-conical shape (i.e. resembling a truncated cone, to allow the central shaft 210 to pass axially through the centre of the friction member). The plurality of friction members 230 includes a first friction member 232, a second friction member 234, and a third friction member 236. Although more than three friction members are depicted in the embodiment shown in FIGS. 2A and 2B, different numbers of friction members may be used in other embodiments. For example, only three friction members may be used in some cases.

The first friction member 232 and the second friction member 234 are coupled to the central shaft 210, and are thus configured to rotate with the central shaft 210 about the axis 220. The third friction member 236 is coupled to the outer housing 215, and is thus configured to rotate with the outer housing 215 about the axis 220.

The third friction member 236 is arranged between the first friction member 232 and the second friction member 234. In other words, friction members coupled to the central shaft 210 are interleaved with friction members coupled to the outer housing 215.

In this embodiment, the clutch 170 is a dry clutch. That is, liquid is not used to lubricate the friction surfaces of the clutch 170. In other embodiments, the clutch 170 is a wet clutch, whereby a cooling lubricating fluid is provided within the outer housing 215.

The clutch 170 comprises a clutch actuator 240. The clutch actuator 240 is a linear actuator in this embodiment. The clutch actuator 240 is coaxial with the axis 220. The clutch actuator 240 is operable to engage and/or disengage the clutch 170, e.g. by applying an axial force to move the central shaft 210 in the axial direction relative to the outer housing 215, or vice-versa. The clutch actuator 240 may be hydraulic or mechanical, for example.

The clutch 170 also comprises a restoring spring 250. The restoring spring 250 is operable to disengage and/or engage the clutch 170, e.g. by generating a restoring force to oppose an axial force applied via the clutch actuator 240. While the restoring spring 250 is depicted in FIGS. 2A and 2B as being housed inside the outer housing 215, in some embodiments the restoring spring 250 is external to the outer housing 215. Arranging the restoring spring 250 outside the outer housing 215 may be beneficial in embodiments in which the clutch 170 is a wet clutch. The restoring spring 250 may ensure that the clutch 170 returns to a "default" disengaged state in the case of failure, e.g. due to hydraulic pressure loss.

Referring to FIG. 2C, the first friction member 232 comprises a friction surface 233. The friction surface 233 may be referred to as an "upstream-facing surface" in that it faces an upstream direction (as shown in FIG. 2C), namely towards the clutch actuator 240.

The second friction member 232 comprises a friction surface 235. The friction surface 235 may be referred to as a "downstream-facing surface" in that it faces a downstream direction (as shown in FIG. 2C), namely away from the clutch actuator 240.

The third friction member 236 comprises two friction surfaces, namely a downstream-facing surface 237 and an upstream-facing surface 238. The downstream-facing surface 237 is opposite the upstream-facing surface 238, in that the two surfaces face opposing directions and exist on opposing sides of the third friction member 236. The downstream-facing surface 237 and the upstream-facing surface 238 are coaxial with the axis 220. The downstream-facing surface 237 may be considered to be the "inside" of a frusto-cone, and the upstream-facing surface 238 may be considered to be the "outside" of the frusto-cone. As such, the third friction member 236 has friction surfaces on both its "inner" and "outer" side. In some cases, one or both of the first and second friction members 232, 234 also comprise two opposing friction surfaces.

The upstream-facing surface 233 of the first friction member 232 and the downstream-facing surface 237 of the third friction member 236 face one another, and may be considered to form a friction surface pair. A friction surface pair comprises two friction surfaces which are brought into contact when the clutch is engaged. Similarly, the downstream-facing surface 235 of the second friction member 234 and the upstream-facing surface 238 of the third friction member 236 face one another, and may be considered to form a friction surface pair.

When the clutch 170 is engaged (as shown in FIG. 2B), the frusto-conical friction surfaces of the different friction members are brought into contact with one another. That is, the upstream-facing surface 233 of the first friction member 232 is brought into contact with the downstream-facing surface 237 of the third friction member 236, the downstream-facing surface 235 of the second friction member 234 is brought into contact with the upstream-facing surface 238 of the third friction member 236, etc. Each friction surface pair is thus brought into frictional contact and contributes to the transmission of torque through the clutch 170.

When the clutch 170 is disengaged (as shown in FIG. 2A), the frusto-conical friction surfaces of the different friction members are separated from one another. That is, the upstream-facing surface 233 of the first friction member 232 is separated from the downstream-facing surface 237 of the third friction member 236, the downstream-facing surface 235 of the second friction member 234 is separated from the upstream-facing surface 238 of the third friction member 236, etc.

The clutch 170 comprises elastic spacers 260, 262 to separate the friction surfaces from one another when the clutch 170 is in the disengaged state. The elastic spacers 260, 262 ensure that, when the clutch 170 is disengaged, the central shaft 210 can rotate about the axis 220 relative to the outer housing 215 in a substantially frictionless manner. The elastic spacers 260, 262 allow the friction members to move coaxially relative to one another, whilst ensuring that the friction members return to a default position in which they are spaced apart.

Elastic spacer 260 is arranged between the first friction member 232 and the second friction member 234. Since both the first friction member 232 and the second friction member 234 are coupled to the inner shaft 210, and the third friction member 236 is not coupled to the inner shaft 210, the elastic spacer 260 may be arranged along the inner shaft 210. Therefore the elastic spacer 260 can connect the first and second friction members 232, 234 without impeding the rotation of (or otherwise contacting) the third friction member 236, which is arranged between the first and second friction members 232, 234. The elastic spacer 260 may be configured to rotate with the inner shaft 210.

Elastic spacer 262 is arranged between the third friction member 236 and a fourth friction member 239 adjacent to and upstream of the second friction member 234. Since the third friction member 236 and the further friction member 239 are coupled to the outer housing 215, and the first and second friction members 232, 234 are not coupled to the outer housing 215, the elastic spacer 262 may be arranged along the outer housing 215. As such, the elastic spacer 262 can connect the third friction member 236 with the further friction member 239 without impeding the rotation of (or otherwise contacting) the first and second friction members 232, 234. The elastic spacer 262 may be configured to rotate with the outer housing 215. In some cases, the clutch does not comprise the elastic spacer 262 arranged between the third friction member 236 and the further friction member 239.

In this embodiment, the central shaft 210 and the outer housing 215 are each connected via respective dog clutches (not shown) to upstream/downstream drive/driven shafts (not shown). The dog clutches enable axial movement of the central shaft 210 relative to the outer housing 215 and/or vice-versa. For example, to engage the clutch 170, the outer housing 215 may be moved axially relative to the central shaft 210 via actuation of a dog clutch.

In this embodiment, the clutch 170 comprises a rigidifying structure 270 configured to constrain the conical friction members 230 in at least the axial direction and/or to increase the structural integrity of the tubular structure.

Figure 3A:
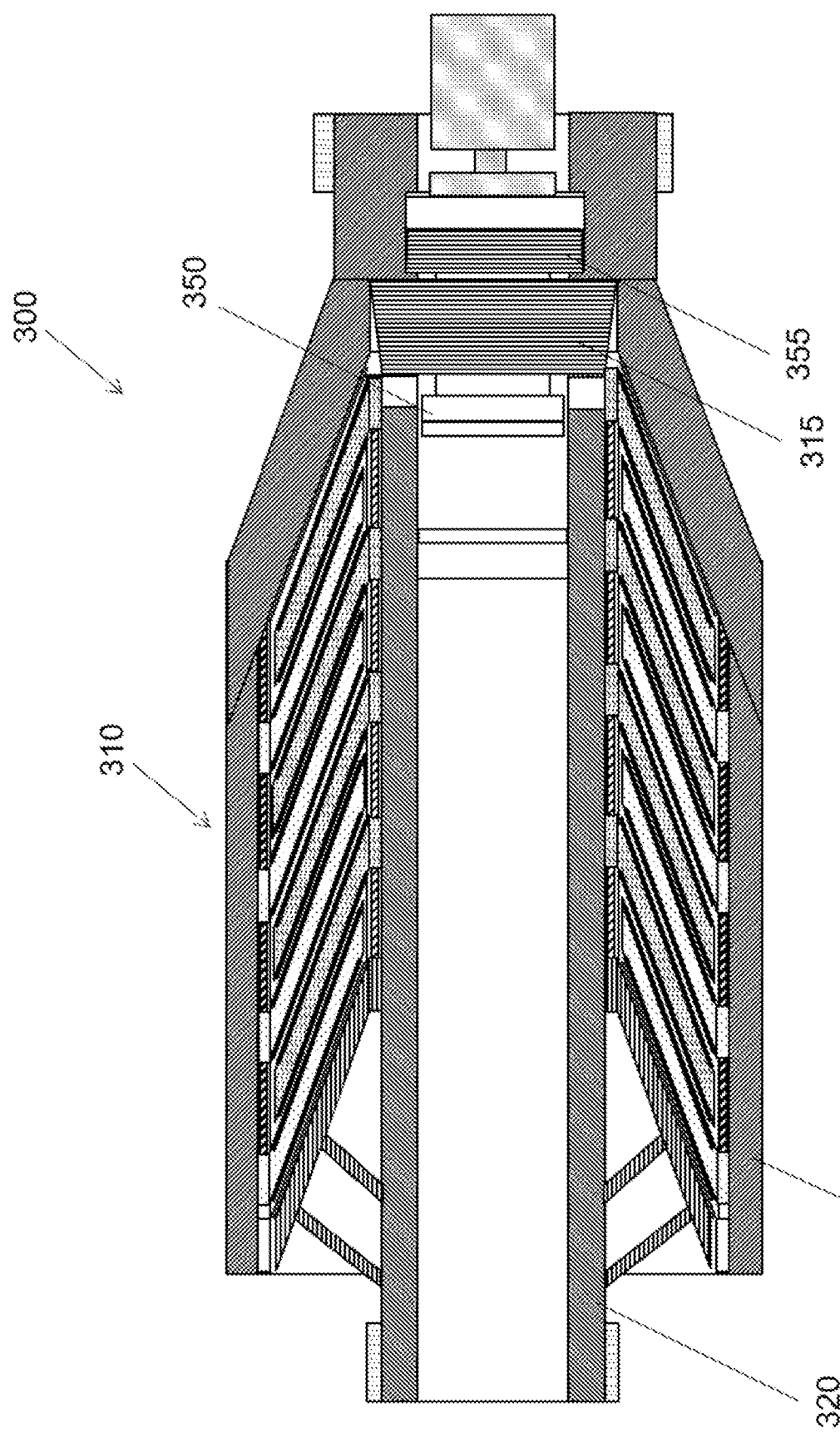
FIG. 3A shows a schematic longitudinal section view of a clutch according to a second embodiment, in a fully disengaged state.
Figure 3B:
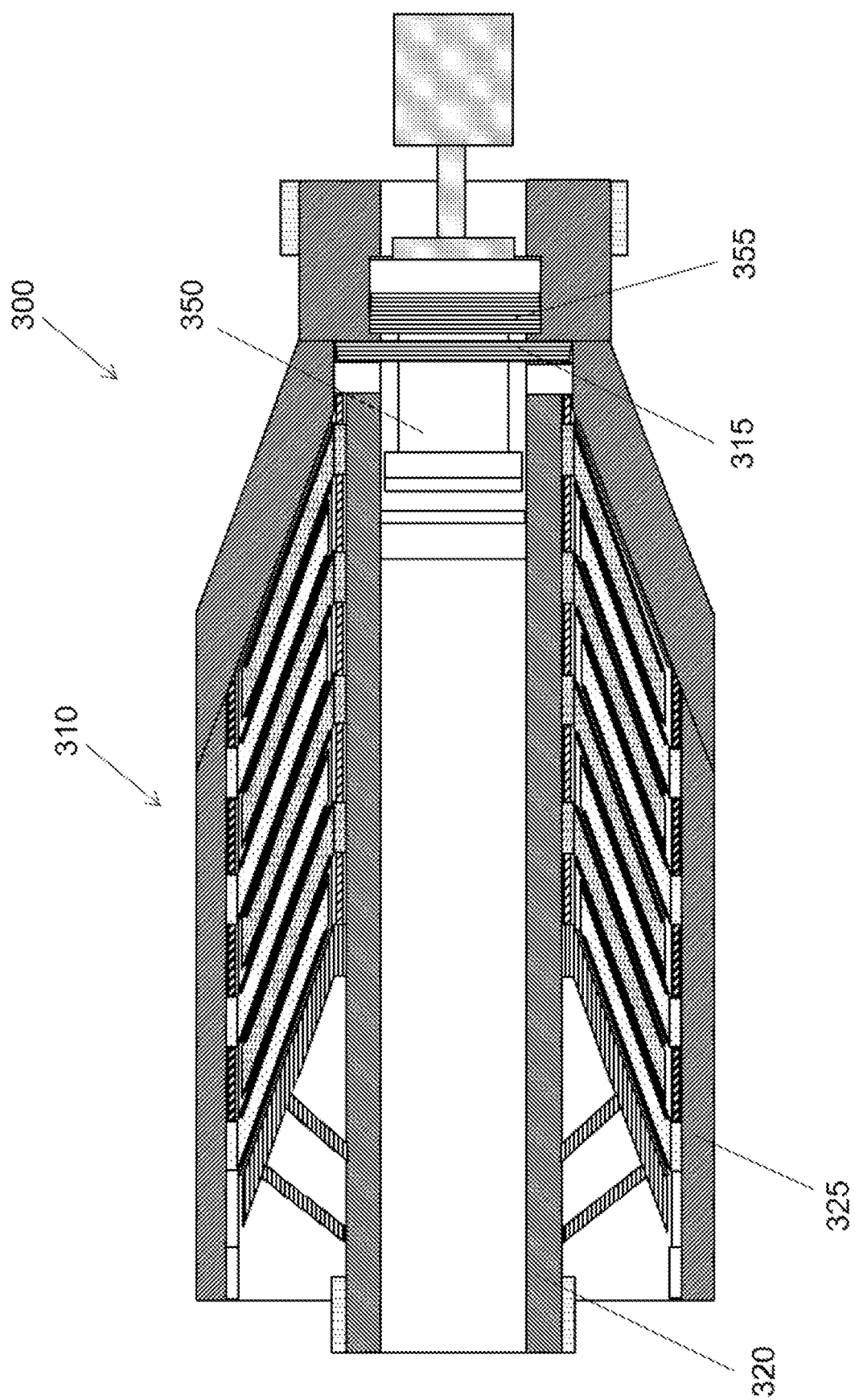
FIG. 3B shows a schematic longitudinal section view of the clutch of the second embodiment, in a semi-engaged state.
Figure 3C:
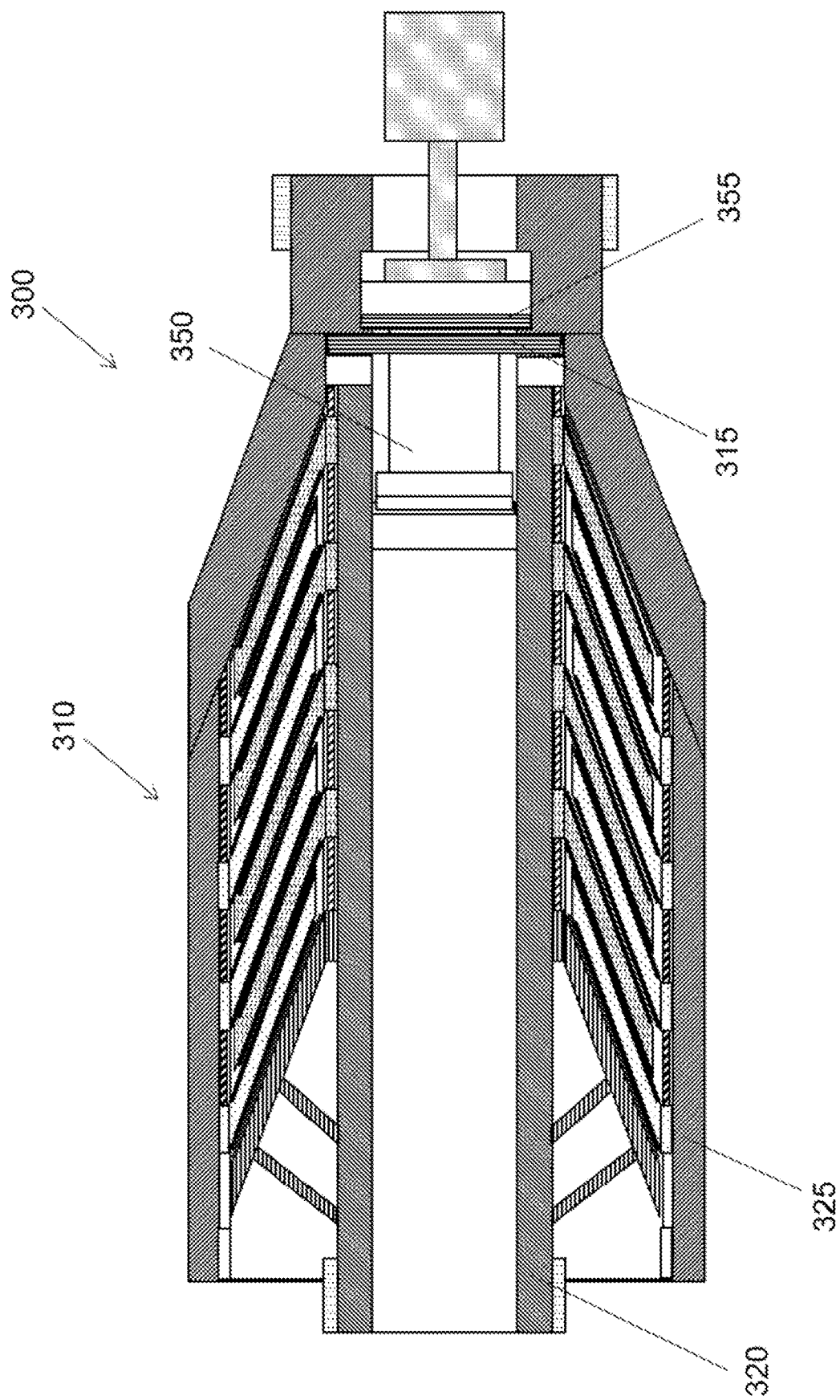
FIG. 3C shows a schematic longitudinal section view of the clutch of the second embodiment, in a fully engaged state.

FIGS. 3A to 3C are longitudinal section views of a clutch assembly 300 according to a second embodiment.

The clutch assembly 300 comprises a friction clutch element 310 and a dog clutch element 350. The friction clutch element 310 is similar to the clutch 170 described with reference to FIGS. 2A to 2C and will not be described further.

The friction clutch element 310 and the dog clutch element 350 are operable to connect the same two shafts, namely the central shaft 320 and the outer housing 325. As such, the two clutch elements 310, 350 can be used complementarily to provide a clutching mechanism for the shafts 320, 325.

The friction clutch element 310 and the dog clutch element 350 provide a two-stage engagement mechanism for the clutch assembly 300. That is, the clutch assembly 300 is engaged by first engaging the friction clutch element 310 and then engaging the dog clutch element 350. Similarly, the clutch assembly 300 can be disengaged by first disengaging the dog clutch element 350 and then disengaging the friction clutch element 310. The friction clutch element 310 and the dog clutch element 350 may be engaged/disengaged in a different order in other examples.

The friction clutch element 310 and the dog clutch element 350 are spring-loaded separately. That is, the clutch assembly 300 comprises a first restoring spring 315 associated with the friction clutch element 310, and a second restoring spring 355 associated with the dog clutch element 350. The first and second restoring springs 315, 355 have different spring constants to enable the different clutch elements to be engaged and/or disengaged sequentially.

In this embodiment, the dog clutch element 350 is arranged within the central shaft 320, thereby saving space compared to a case in which the dog clutch element 350 is arranged elsewhere.

FIG. 3A shows the clutch assembly 300 in a fully disengaged state. In the fully disengaged state, both the friction clutch element 310 and the dog clutch element 350 are disengaged. As such, the friction surfaces of the friction clutch element 310 are not in contact with one another, and the teeth of the dog clutch element 350 are not engaged with the splines of the dog clutch element 350. The central shaft 320 is operable to rotate relative to the outer housing 325 in a substantially frictionless manner when the clutch assembly 300 is in the fully disengaged state.

FIG. 3B shows the clutch assembly 300 in a semi-engaged state. In this state, the friction clutch element 310 is engaged (i.e. the friction surfaces of the friction clutch element 310 are in frictional contact with one another) but the dog clutch element 350 is not engaged. The engaged friction clutch element 310 provides a first resistive torque increment. The clutch assembly 300 may be in the semi-engaged state when an applied axial force is sufficient to overcome the resistive force of the restoring spring 315 of the friction clutch element 310, but is not sufficient to overcome the resistive force of the restoring spring 355 of the dog clutch element 350.

FIG. 3C shows the clutch assembly 300 in a fully engaged state. In this state, both the friction clutch element 310 and the dog clutch element 350 are engaged. As such, the friction surfaces of the friction clutch element 310 are in contact with one another, and the teeth of the dog clutch element 350 are engaged with the splines of the dog clutch element 350. The dog clutch element 350 may be engaged when sufficient contact and/or pressure is applied between the friction surfaces of the friction clutch element 310. The engaged dog clutch element 350 provides a second resistive torque increment, in addition to the first resistive torque increment provided by the engaged friction clutch element 310.

To disengage the clutch assembly 300 (e.g. when the applied actuating force is released), the dog clutch element 350 is first disengaged, since the restoring spring 355 of the dog clutch element 350 generates a greater restoring force than the restoring spring 315 of the friction clutch element 310. The friction surfaces of the friction clutch element 310 remain in contact with one another (albeit being allowed to slip if the torque exceeds a given threshold) until the dog clutch element 350 is sufficiently (or, in some cases, completely) disengaged. Finally, the friction surfaces of the friction clutch element 310 are separated to enable a substantially frictionless disengaged state.

Figure 4:
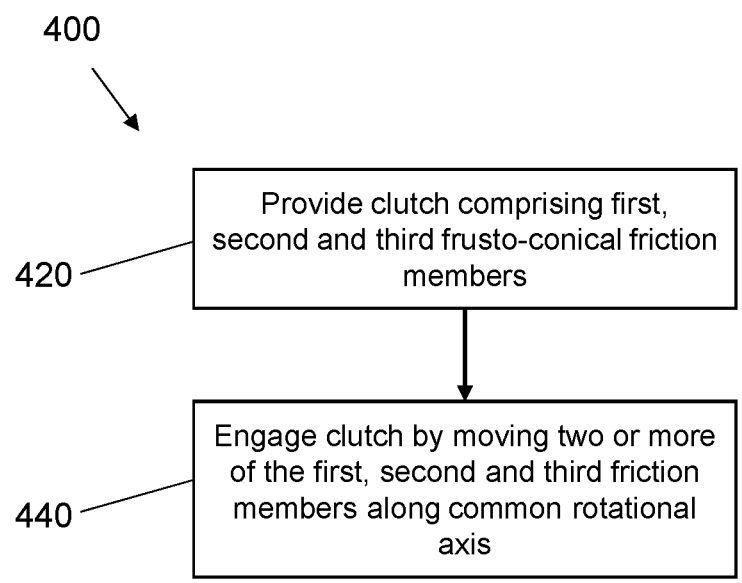
FIG. 4 shows a flow chart depicting a method according to a third embodiment.

FIG. 4 shows a method 400 for selectively transmitting torque on an aircraft. The method 400 may be used in conjunction with a clutch or clutch assembly such as the clutches 170, 310 or clutch assembly 300 described above.

At item 420, a clutch is provided. The clutch comprises a plurality of frusto-conical friction members including first, second and third friction members. The first, second and third friction members have a common rotational axis. That is, they are coaxial. The third friction member comprises a first friction surface and a second friction surface, opposite the first friction surface.

At item 440, the clutch is engaged by moving two or more of the first, second and third friction members along the common rotational axis, such that the first and second friction surfaces of the third friction member are brought into contact with friction surfaces of the first and second friction members, respectively. For example, the first and third friction members may be moved towards the second friction member, the second and third friction members may be moved towards the first friction member, the first and second friction members may be moved (inwardly) towards the third friction member, or all three friction members may be moved such that a separation between the friction members is reduced and, ultimately, removed.

The clutch comprises spacer means arranged between the first friction member and the second friction member. The spacer means are operable to separate the first and second friction surfaces of the third friction member from the friction surfaces of the first and second friction members, respectively, when the clutch is a disengaged state.

Figure 5:
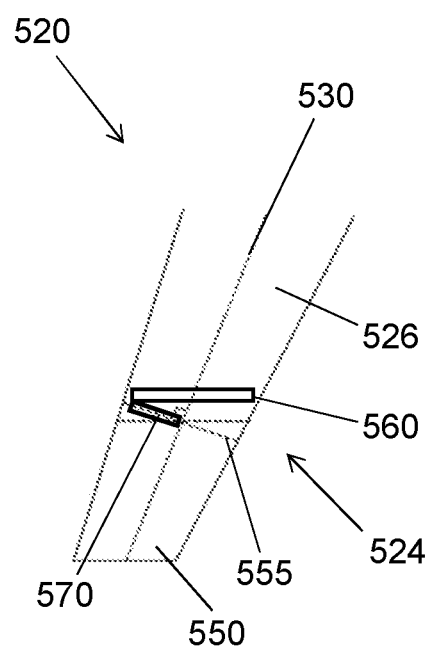
FIG. 5 shows a schematic plan view of part of a wing of an aircraft according to a further embodiment.

FIG. 5 shows a plan view of a part of an aircraft wing 520 according to a further embodiment. Some items depicted in FIG. 5 are similar to those depicted in FIGS. 1A and 1B. Corresponding reference numerals, incremented by 400, are used for similar items, and the description of such items above is applicable to the embodiment shown in FIG. 5.

In this embodiment, the clutch 570 is orientated substantially parallel with the hinge 555, which is orientated non-parallel to the line-of-flight direction. As such, the clutch 570 is angled with respect to the tubular shaft of the wing tip actuator 560. For example, the clutch 570 may be arranged on a secondary shaft, linked to the tubular shaft via a bevel gear for instance, the secondary shaft being arranged along (or at least aligned with) the hinge 555 and configured to rotate the wing tip device 550 about the hinge 555 in response to rotation of the tubular shaft. By arranging the clutch 570 along the hinge 555 (and thus angled with respect to the wing tip actuator 560), an amount of back-driving of the wing tip actuator 560 caused by torque acting upon the wing tip device 550 may be reduced, compared to a case in which the clutch 570 is not arranged along the hinge 555.

The clutch according to the examples described herein may be assembled by sequentially stacking the conical friction members together. Further, the clutch is readily scalable. For example, if the required torque capability of the clutch were to increase (e.g. due to a need to withstand higher loads on a particular aircraft wing), additional conical friction members can be added to the stack, thereby increasing the torque capability of the clutch. Since the conical friction members are stacked coaxially, increasing the number of friction members does not necessitate an increase in the diameter of the clutch. As stated above, in some applications, for example on aircraft wings, the diameter of the clutch may be substantially more restricted (e.g. for aerodynamic reasons) than the length of the clutch. Therefore the presently described clutch may be scaled to achieve significant torque capabilities whilst conforming to restrictive geometric parameters (and achieving a desired aerodynamic profile).

The diametric advantage of a multi-cone friction clutch over other friction clutches will now be described using the following equations, derived from uniform pressure theory of a conical clutch, and combined with multi-disc theory, which dictates that as uniform pressure is assumed, the total torque capabilities $T_{total}$ of N cones is equal to the sum of the torque of each pair of cone surfaces brought into contact. Hence given the uniform pressure assumption, $$T_{total} = N \times \pi \times \mu \times \frac{p_a(D_c^3 - d_c^3)}{12 \times \sin(\alpha_c)}$$

$$T_{total} = N \times \mu \times \frac{F_a(D_c^3 - d_c^3)}{3 \times \sin(\alpha_c) \times (D_c^2 - d_c^2)}$$

where $\mu$ is the material friction coefficient wet or dry, static or dynamic, $p_a$ is the maximum allowable pressure on the material, $F_a$ is the maximum allowable force applied axially on the cone, $d_c$ is the cone top diameter (namely the diameter of the cone at its smallest point, which for a frusto-cone is non-zero), $D_c$ is the cone base diameter (namely the diameter of the cone at its greatest point), and $\alpha_c$ is the cone slope angle. N is the number of friction cones for single-sided friction, or the number of friction surfaces, where each cone establishes contact on both the inner and outer surfaces when engaged (in which case the number of cones then becomes N/2+1). Rearranging for $D_c$ for a fixed diameter ratio (providing a value of $d_c$) or predetermined internal diameter (e.g. of the central shaft), the advantage of using multiple cones is highlighted. The length of the clutch can then be obtained by deriving the length of a cone and determining the distance between each cone in the disengaged state, and adding per number of cones. Given this model, the capability of the clutch can be demonstrated. It can be seen that as the cone slope angle decreases, torque performance improves.

Given this geometrical model, there is a clear sizing advantage in the diameter of the clutch, the number of friction surface pairs required, and the maximum axial force, of the multi-cone clutch over a multi-disc clutch. For example, it has been found that a multi-cone clutch with friction surfaces made from steel requires fewer friction surfaces than a multi-plate clutch with friction surfaces made from rubber (despite rubber having a larger friction coefficient than steel) of a similar diameter. High torque capabilities may be achieved for rubber-rubber friction surface pairs and with relatively low numbers of conical friction members. High torque capabilities can also be achieved using steel, although a greater number of conical friction members may be required. Further, aluminium alloys may have comparable friction coefficients to rubber. Therefore a multi-cone clutch with aluminium-aluminium friction surface pairs may achieve desirable torque capabilities with similar complexity (or lack thereof) to rubber-rubber friction surface pairs, whilst being relatively lightweight and being less susceptible to wear and/or heating than a rubber-rubber friction clutch.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In examples described above, the clutch actuator is centralised and aligned with the input and output shafts of the clutch. In some other examples, clutch actuation is distributed outside of the clutch using multiple actuators distributed around the outer housing and configured to push/pull in the axial direction.

In examples described above, the clutch device is used in actuating a wing tip device on an aircraft. The clutch device described herein may be used for other purposes in other cases. The clutch device may be used on vehicles other than aircraft, for example. The clutch device may be used for selective transmission shut-off and/or torque reduction in any shaft to shaft transmission application.

In examples described above, a linear actuator is used to engage the clutch and a restoring spring is used to disengage the clutch. In other examples, the restoring spring is used to engage the clutch and the linear actuator is used to disengage the clutch. That is, a default state of the clutch may be either of the engaged state and the disengaged state.

In some examples described above, a friction clutch is combined with a dog clutch to form a two-stage clutch assembly. In other examples, the friction clutch is combined with other types of clutch to have a similar effect. For example, a magnetic lock clutch may be used.

In examples described above, the outer housing of the clutch (e.g. forming the output shaft) comprises a single structure. In other examples, the outer housing comprises multiple elements (due to manufacturing and assembly considerations, for instance), coupled such that torque can be transmitted by the outer housing.

In some examples described above, springs are used as the spacer means for separating adjacent friction surfaces in the clutch. Other examples of spacer means include, but are not limited to, polymers (e.g. elastic polymers) and compliance structures arranged along the splines coupling the friction members to their respective shafts. Such spacer means may be arranged to allow for movement of the friction members in the axial direction, whilst separating the friction surfaces from one another when the clutch is in the disengaged state.

In some embodiments, a heat management system (e.g. a heat sink) is provided for the clutch. The heat management system may be provided within the central shaft of the clutch (thereby saving space) or externally to the outer housing. The heat management system may be operable to remove heat generated by the friction surfaces. In some cases, a given friction member is comprised of a metal, and has a friction surface (either metallic or non-metallic) disposed upon it. The metal "core" of the friction member may further assist in heat dissipation in the clutch.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

The invention claimed is:

1. An aircraft wing, comprising:
   a clutch for use in actuating a wing tip device on an aircraft, the aircraft comprising a fixed wing, a wing tip device, and a wing tip actuator for moving the wing tip device relative to the fixed wing, the clutch being operable to selectively transmit torque between the wing tip actuator and the wing tip device via engagement of a first shaft with a second shaft, the clutch comprising:

first and second friction members coupled with the first shaft, and each having a frusto-conical friction surface;
a third friction member coupled with the second shaft, and arranged coaxially with, and between, the first and second friction members, the third friction member having first and second frusto-conical friction surfaces operable such that, when the clutch is engaged, the first and second friction surfaces of the third friction member are brought into contact with the friction surfaces of the first and second friction members, respectively;
spacer means arranged between the first and second friction members, the spacer means being operable to separate the first and second friction surfaces of the third friction member from the friction surfaces of the first and second friction members, respectively, when the clutch is in a disengaged state; and
a fourth friction member coupled with the second shaft and arranged coaxially with the first, second and third friction members, the second friction member being arranged between the third friction member and the fourth friction member, the fourth friction member having a frusto-conical friction surface,
wherein the second friction member has first and second frusto-conical friction surfaces operable such that, when the clutch is engaged, the first friction surface of the second friction member is brought into contact with the second friction surface of the third friction member, and the second friction surface of the second friction member is brought into contact with the friction surface of the fourth friction member.

2. The aircraft wing according to claim 1, wherein the spacer means are configured such that, when the clutch is in the disengaged state, a distance between the first friction surface of the third friction member and the friction surface of the first friction member is substantially equal to a distance between the second friction surface of the third friction member and the friction surfaces of the second friction member.

3. The aircraft wing according to claim 1, wherein the spacer means are configured to resiliently bias the first and second friction members towards the disengaged state.

4. The aircraft wing according to claim 1, wherein the spacer means comprise at least one spring.

5. The aircraft according to claim 1, wherein the first, second and third friction members are movable in a coaxial direction independently of one another.

6. The aircraft wing according to claim 1, wherein, when the clutch is in the disengaged state, the first shaft is free to rotate relative to the second shaft in a substantially frictionless manner.

7. The aircraft wing according to claim 1, wherein the first shaft comprises a central shaft and the second shaft comprises an outer housing at least partially encompassing the central shaft, the central shaft and the outer housing being configured to rotate together about a shared rotational axis when the clutch is in an engaged state.

8. The aircraft wing according to claim 7, wherein the first and second friction members are coupled to the first shaft, and the third friction member is coupled to the second shaft, via splines orientated substantially parallel to the shared rotational axis.

9. The aircraft wing according to claim 1, wherein the friction surface of the first and/or second friction member, and/or one or both of the friction surfaces of the third friction member, is comprised of aluminium.

10. The aircraft wing according to claim 1, the aircraft wing comprising a clutch assembly, the clutch assembly comprising the clutch and further comprising a dog clutch.

11. The aircraft wing according to claim 10, wherein the dog clutch is arranged coaxially with the clutch.

12. The aircraft wing according to claim 10, wherein the dog clutch is at least partially enclosed by the first shaft and/or the second shaft.

13. The aircraft wing according to claim 10, wherein the clutch assembly is configured to be engaged by, sequentially:
engaging the clutch; and
engaging the dog clutch.

14. The aircraft wing according to claim 10,
wherein the clutch is configured to be engaged when an applied axial force exceeds a first threshold value, and
wherein the dog clutch is configured to be engaged when an applied axial force exceeds a second threshold value, different from the first threshold value.

15. The aircraft wing according to claim 14, wherein the first threshold value is less than the second threshold value.

16. The aircraft wing according to claim 10,
wherein the clutch comprises a first restoring spring operable to generate a first restoring force to urge the clutch into the disengaged state,
wherein the dog clutch comprises a second restoring spring operable to generate a second restoring force to urge the dog clutch into a disengaged state, and
wherein the first restoring spring has a spring constant having a first value, and the second restoring spring has a spring constant having a second, different value.

17. The aircraft wing according to claim 16, wherein the value of the spring constant of the first restoring spring is smaller than the value of the spring constant of the second restoring spring.

18. A method for selectively transmitting torque on an aircraft, the method comprising:
providing a clutch being operable to selectively transmit torque between an actuator and a device via engagement of a first shaft and a second shaft, the clutch comprising a plurality of frusto-conical friction members including first, second, third, and fourth friction members, wherein the fourth friction member is coupled with the second shaft and arranged coaxially with the first, second, and third friction members, the third friction member comprising a first friction surface and a second friction surface, opposite the first friction surface; and
engaging the clutch by moving two or more of the first, second and third friction members along the common rotational axis, such that the first and second friction surfaces of the third friction member are brought into contact with friction surfaces of the first and second friction members, respectively,
wherein the clutch comprises spacer means arranged between the first friction member and the second friction member, the spacer means being operable to separate the first and second friction surfaces of the third friction member from the friction surfaces of the first and second friction members, respectively, when the clutch is in a disengaged state.

19. An aircraft, comprising:
a wing, the wing having a fixed wing with a wing tip device, the wing tip device rotatably mounted on a hinge such that the wing tip device may rotate, about the hinge, relative to the fixed wing;

an actuator operable to cause the wing tip device to rotate about the hinge; and
a clutch arranged to selectively disengage the wing tip device from the actuator, the clutch comprising a plurality of frusto-conical friction members including first, second and third friction members having a common rotational axis, each of the first, second and third friction members being moveable independently along the common rotational axis,
wherein the third friction member comprises a first friction surface and a second friction surface, opposite the first friction surface, and
wherein the plurality of friction members is arranged such that, when the clutch is engaged, the first and second friction surfaces of the third friction member are brought into contact with friction surfaces of the first and second friction members respectively, to enable torque to be transmitted between the wing tip device and the actuator.

20. An aircraft wing, comprising:
a clutch for use in actuating a wing tip device on an aircraft, the aircraft comprising a fixed wing, a wing tip device, and a wing tip actuator for moving the wing tip device relative to the fixed wing, the clutch being operable to selectively transmit torque between the wing tip actuator and the wing tip device via engagement of a first shaft with a second shaft, the clutch comprising:
first and second friction members coupled with the first shaft, and each having a frusto-conical friction surface;
a third friction member coupled with the second shaft, and arranged coaxially with, and between, the first and second friction members, the third friction member having first and second frusto-conical friction surfaces operable such that, when the clutch is engaged, the first and second friction surfaces of the third friction member are brought into contact with the friction surfaces of the first and second friction members, respectively; and
spacer means arranged between the first and second friction members, the spacer means being operable to separate the first and second friction surfaces of the third friction member from the friction surfaces of the first and second friction members, respectively, when the clutch is in a disengaged state.

* * * * *